United States Patent
Karlinger et al.

(10) Patent No.: US 8,642,888 B2
(45) Date of Patent: Feb. 4, 2014

(54) CABLE PROTECTION DEVICE FOR AN INDUSTRIAL ROBOT AND INDUSTRIAL ROBOT WITH SUCH A CABLE PROTECTION DEVICE

(75) Inventors: Stefan Karlinger, Augsburg (DE); Rainer Krumbacher, Rettenbach a.A. (DE)

(73) Assignee: KUKA Roboter GmbH, Augsburg (DE)

( * ) Notice: Subject to any disclaimer, the term of this patent is extended or adjusted under 35 U.S.C. 154(b) by 519 days.

(21) Appl. No.: 12/950,134

(22) Filed: Nov. 19, 2010

(65) Prior Publication Data
US 2011/0127083 A1    Jun. 2, 2011

(30) Foreign Application Priority Data

Dec. 1, 2009 (DE) .......................... 10 2009 056 455

(51) Int. Cl.
*H02G 11/00*    (2006.01)
(52) U.S. Cl.
USPC ........ 174/70 R; 174/72 A; 218/568; 439/488; 310/171; 310/908
(58) Field of Classification Search
USPC ............... 174/70 R, 72 A; 218/568; 439/488; 310/171, 908
See application file for complete search history.

(56) References Cited

U.S. PATENT DOCUMENTS

| 5,777,267 | A  | * | 7/1998 | Szydel | 174/72 A |
| 6,207,902 | B1 | * | 3/2001 | Balaguer | 174/112 |
| 7,854,615 | B1 | * | 12/2010 | Kachline et al. | 439/13 |

FOREIGN PATENT DOCUMENTS

EP    1 453 170 A2    9/2004

OTHER PUBLICATIONS

German Patent Office; Office Action in German Patent Application No. 10 2009 056 455.1 dated Sep. 20, 2010; 9 pages.

* cited by examiner

*Primary Examiner* — Dhirubhai R Patel
(74) *Attorney, Agent, or Firm* — Wood, Herron & Evans, LLP

(57) ABSTRACT

The invention relates to a conducting line protection device for an industrial robot having at least one power line, having a basic ring section, a hollow cylinder section whose diameter is matched to an inside diameter of a pipe component of the industrial robot that rotates relative to the conducting line protection device, an inner edge rounding section whose rounding radius is matched to a diameter of the power line, and a radial bearing section for rotatable support of the conducting line protection device relative to the pipe component of the industrial robot. The invention also relates to an industrial robot having such a conducting line protection device.

20 Claims, 4 Drawing Sheets

CABLE PROTECTION DEVICE FOR AN INDUSTRIAL ROBOT AND INDUSTRIAL ROBOT WITH SUCH A CABLE PROTECTION DEVICE

TECHNICAL FIELD

The invention relates to a conducting line protection device for an industrial robot having at least one power line, and to an industrial robot having such a conducting line protection device.

BACKGROUND

From EP 1 453 170 A2 a device is known for running a plurality of conducting elements between a first element and a second element, which are rotatable relative to each other around an axis of rotation, the conducting elements containing an electric line and/or a fluid line, wherein one end of each conducting element is held in place on the first element by a mounting element and the other end thereof is held in place on the second element by a mounting element. A plurality of conducting elements are divided into a first and a second group, the first group of conducting elements being run so as to extend through an inner hole of the inner tube element and the second group of conducting elements being run so as to extend through a ring-shaped gap that is formed between the inner tube element and the outer tube element. In this way a device for running conducting elements is to be provided which may be applied simply to a part having an outer element and an inner element which are rotatable relative to each other, such as for example a swivel-base part of a robot, in particular a joint part, and which requires a small space for installation and permits a demand for a large range of relative motion between the outer element and the inner element.

The object of the invention is to create a conducting line protection device for an industrial robot which is capable of protecting power lines using simple means.

SUMMARY OF THE INVENTION

It is proposed according to the invention that the conducting line protection device for an industrial robot having at least one power line include at least the following features:
 a basic ring section,
 a hollow cylinder section, whose diameter is matched to an inside diameter of a pipe component of the industrial robot that turns relative to the conducting line protection device,
 an inner edge rounding section, whose rounding radius (radius of curvature) is matched to a diameter of the power line, and
 a radial bearing section for rotatable support of the conducting line protection device relative to the pipe component of the industrial robot.

The basic ring section forms a carrier section for the hollow cylinder section, the inner edge rounding section and the radial bearing section. Basic ring section, hollow cylinder section, inner edge rounding section and radial bearing section may be constructed in single pieces or assembled from a plurality of individual pieces.

At least one power line is understood to mean a robot cable set that includes electrical energy supply lines, possibly also signal lines to the motors, and/or energy feeds that include supply lines, for example electric lines, cold and/or warm water lines, fluid lines and/or pressure lines to tools of the industrial robot. The power lines may be routed through the conducting line protection device according to the invention in individual lines or in cable bundles, in particular provided with flexible protective tubes.

Because the conducting line protection device has a radial bearing section for rotatable support of the conducting line protection device relative to the pipe component of the industrial robot, wear to the at least one power line can be reduced, and the motion of the carousel relative to the base frame may involve less friction.

There may be provision for providing an industrial robot with a conducting line protection device according to the invention at the factory and delivering it pre-installed, or there may be provision for offering the conducting line protection device according to the invention separately for retrofitting.

In one embodiment, the radial bearing section may form the bearing surface of a friction bearing. The radial bearing section may be formed by a ring projection that protrudes from the circumference of the conducting line protection device. In this case, the radially protruding ring projection of the conducting line protection device is designed to engage with a corresponding ring groove of a carrier component, such as the base frame of the industrial robot or the pipe component. Alternatively, the radial bearing section may be formed by a groove-shaped indentation in the side wall of the conducting line protection device. In this case, the groove-shaped indentation of the conducting line protection device is designed to encircle a corresponding radially protruding-in particular toward the inside-ring projection of a carrier component, such as the base frame of the industrial robot or the pipe component.

In an alternative embodiment, the radial bearing section may form a seat for a separate roller bearing. In this embodiment the friction bearing is replaced by a roller bearing. Commercially available rolling-contact bearings may also be used. In particular, depending on the need, simple grooved ball bearings, roller bearings, cone bearings or barrel-shaped bearings may be utilized. It is particularly expedient to use radial bearings. In this case the radial bearing section of the conducting line protection device forms a seat for example for an inner ring of the rolling-contact bearing. The radial bearing section of the conducting line protection device may possibly be formed by a smooth wall of a cylinder sleeve of the conducting line protection device, onto which the inner ring of the rolling-contact bearing may be pressed or cemented.

The hollow cylinder section, in order to be pushed into the pipe component, may have an outside diameter that is matched to the inside diameter of the pipe component with a perfect fit or with slight play. With the aid of the hollow cylinder section, the conducting line protection device may be pushed at least part of the way into the pipe component. In this respect the hollow cylinder section forms a sort of nipple or fitting, in order to create a transition from the pipe component to the inner edge rounding section of the conducting line protective device.

Alternatively, for flush connection to the pipe component the hollow cylinder section may have an inside diameter that corresponds to the inside diameter of the pipe component. In that case the hollow cylinder section of the conducting line protection device and the pipe component may abut each other end to end, or may be aligned with each other leaving merely a slight gap.

The conducting line protection device may be cut longitudinally into multiple pieces, in particular two pieces. As mentioned earlier, the basic ring section, hollow cylinder section, inner edge rounding section and radial bearing section may be constructed in single pieces or assembled from a plurality of individual pieces. In order for example to enable easy assembly in conjunction with a retrofitting, the ring-shaped conducting line protection device may be in particular cut into two pieces longitudinally. In that case the ring-shaped conducting line protection device is formed of two C-shaped half-pipe sections that can be fitted together to form a closed circular ring.

An industrial robot according to the invention exhibits the following features:
- a base frame,
- a carousel,
- a pipe component that rotates between base frame and carousel, through which at least one power line is routed, and
- a conducting line protection device according to the invention, as described.

The pipe component may be solidly connected to the base frame. The pipe component may be in particular a hollow shaft. The hollow shaft may be part of a transmission, in particular a planetary transmission, which connects the carousel rotatably to the base frame. The conducting line protection device according to the convention is routed in this case through the pipe component or hollow shaft. Alternatively, the pipe component may be solidly connected to the carousel.

Since the danger point is located at the lower end of the hollow shaft and the free diameter of the hollow shaft should not be reduced, the conducting line protection device according to the invention may be situated underneath and outside of the hollow shaft. There the conducting line protection device, which may form a deflector bushing or guard ring, may be mounted so that it turns freely but is axially fixed and non-tipping. The interior contour of the deflector bushing begins at the hollow shaft with the diameter prescribed there, and expands downward in such a way as to provide more free space for the power lines and to safely hold them away from the lower edge of the hollow shaft.

The support may be provided by a rolling-contact bearing, for example a ball bearing. A shoulder on the outside of the deflection bushing, the size of a ball bearing and with slight play for permanent lubrication, may serve alternatively as a friction bearing.

The conducting line protection device or the deflection bushing may be made of a low-friction material, in particular a plastic such as polyoxymethylene (POM).

If a conducting line is in contact, then only with the conducting line protection device according to the invention or with the deflection bushing, and not with the sharp-edged end of the pipe component or of the hollow shaft. Instead of rubbing against each other, the conducting line protection device or the deflection bushing rotates together with the power line, so that only a pressing force remains, without friction.

The industrial robot according to the invention may have a rolling-contact bearing, in particular a radial bearing, to support the conducting line protection device rotatably relative to the pipe component. Compared to a friction bearing, a rolling-contact bearing has the advantage that higher forces can be absorbed with less friction. Thus low-friction, problem-free movement of the carousel on the base frame is guaranteed. Precisely in the event of lower dynamics of the basic axes of the industrial robot compared to the hand axes, according to the invention rolling-contact bearings for rotatable support of the conducting line protection device may be advisable.

In one variant, the rolling-contact bearing or radial bearing may be connected on one side to the radial bearing section of the conducting line protection device and on the other side to the base frame. If the inner ring of the rolling-contact bearing is connected to the conducting line protection device, then the outer ring of the rolling-contact bearing may be fixed on the base frame. If the outer ring of the rolling-contact bearing is connected to the conducting line protection device, then the inner ring of the rolling-contact bearing may be fixed on the base frame. The rolling-contact bearing may for example be pressed or cemented into a pre-formed seat in the base frame.

In another variant, the rolling-contact bearing or radial bearing may be connected on one side to the radial bearing section of the conducting line protection device and on the other side to the pipe component. In this respect the conducting line protection device may be rotatably supported on the pipe component or the hollow shaft of the industrial robot. The rolling-contact bearing or radial bearing is preferably situated outside the circumference of the pipe component or hollow shaft.

BRIEF DESCRIPTION OF THE DRAWINGS

The invention will be explained in further detail on the basis of an exemplary embodiment. All of the features of this concrete exemplary embodiment may disclose additional advantageous embodiments of the invention.

The figures show the following.

DETAILED DESCRIPTION

Figure 1:
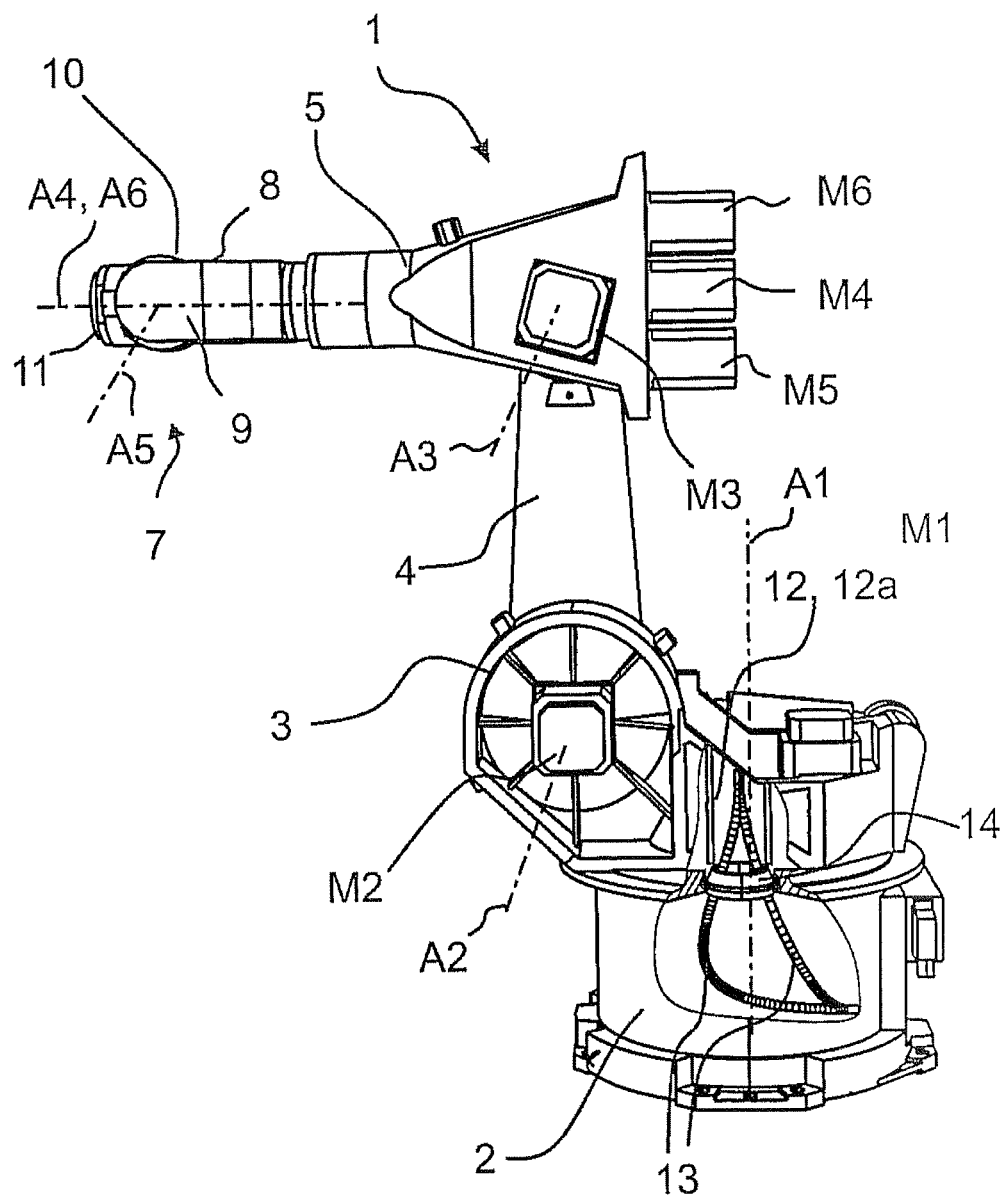
FIG. 1 a perspective view of an industrial robot having a conducting line protection device according to the invention.

FIG. 1 shows an industrial robot 1 having a base frame 2 on which a carousel 3 is supported so that it is rotatable around a first vertical axis A1 and is rotary-driven by means of a first drive motor M1. A motion link 4 is supported on carousel 3 so that it can swivel up and down around a second horizontal axis A2 and is rotary-driven by means of a second drive motor M2. Motion link 4 carries an arm 5, which is supported so that it can swivel up and down around a third horizontal axis A3 and is rotary-driven by means of a third drive motor M3. Provided on arm 5 is a fourth axis A4, which runs in the longitudinal extension direction of arm 5 and rotary-drives a hand 7 of arm 5 by way of a fourth drive motor M4. A first leg 8 and a second leg 9 extend forward in a fork from hand 7. The two legs 8 and 9 carry a support for a free end 10 of hand 7. The support defines a fifth axis A5 of industrial robot 1, around which hand 7 may be swiveled by means of a fifth drive motor M5. Additionally, hand 7 has a sixth axis A6, in order to be able to rotatably drive an attaching flange 11 by means of a sixth drive motor M6.

In the depicted exemplary embodiment, carousel 3 has a pipe component 12 which forms a hollow shaft 12a of industrial robot 1. Pipe component 12 is firmly connected to carousel 3. In the exemplary embodiment, two power lines 13 are routed through the hollow space of pipe component 12. Situated at a lower end of pipe component 12 is conducting line protection device 14 according to the invention. Conducting line protection device 14 is rotatably supported on carousel 3.

Figure 2:
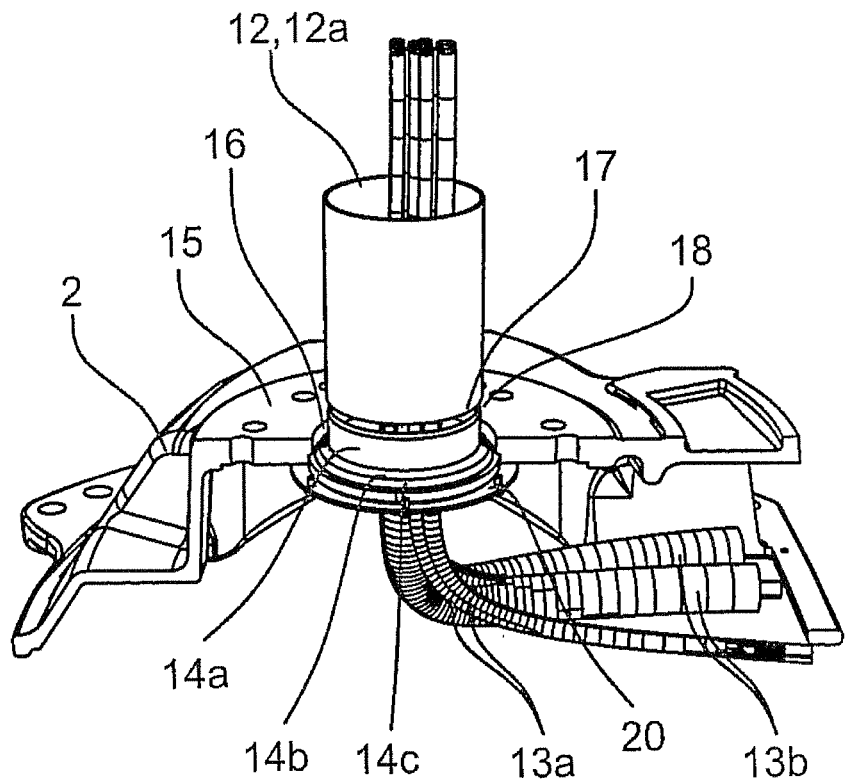
FIG. 2 a perspective view of a cutaway portion of the industrial robot according to FIG. 1 having the conducting line protection device according to the invention.

FIG. 2 depicts a cutaway part of industrial robot 1 having conducting line protection device 14 according to the invention, in an enlarged view. A floor 15, which is part of base frame 2, has a central opening 16. Coaxially to central opening 16 extends pipe component 12, i.e., hollow shaft 12*a*. Hollow shaft 12*a* may be part of a planetary transmission (not shown), which rotatably drives carousel 3 supported on base frame 2.

Hollow cylinder section 14*a* of conducting line protection device 14 abuts one end face 17 of pipe component 12, connecting nearly flush with pipe component 12, leaving a small gap 18. Hollow cylinder section 14*a* has an inside diameter that corresponds to or is matched to the inside diameter of pipe component 12. Hollow cylinder section 14*a* of conducting line protection device 14 and pipe component 12 almost abut each other or align with each other, leaving gap 18.

Hollow cylinder section 14*a* of conducting line protection device 14 is connected through a basic ring section 14*b* to a radial bearing section 14*c* of conducting line protection device 14. In the exemplary embodiment depicted, radial bearing section 14*c* is designed as a friction bearing.

Here radial bearing section 14*c* forms a ring projection that protrudes radially on the circumferential side of conducting line protection device 14. The radially protruding ring projection of conducting line protection device 14 is designed to engage a corresponding ring groove 19 (FIG. 4*a*) of a carrier component 20. In the present exemplary embodiment, carrier component 20 is designed as a separate carrier ring, which is attached to base frame 2. Routed through pipe component 12 as power lines 13 are two robot cable sets 13*a* and two energy feeds 13*b*.

Figure 3A:
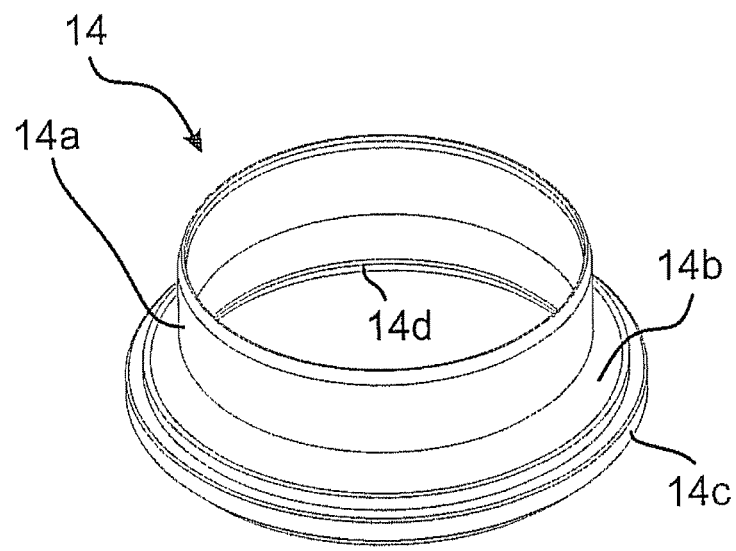
FIG. 3a a perspective view of a one-piece variant of the conducting line protection device standing alone.
Figure 3B:
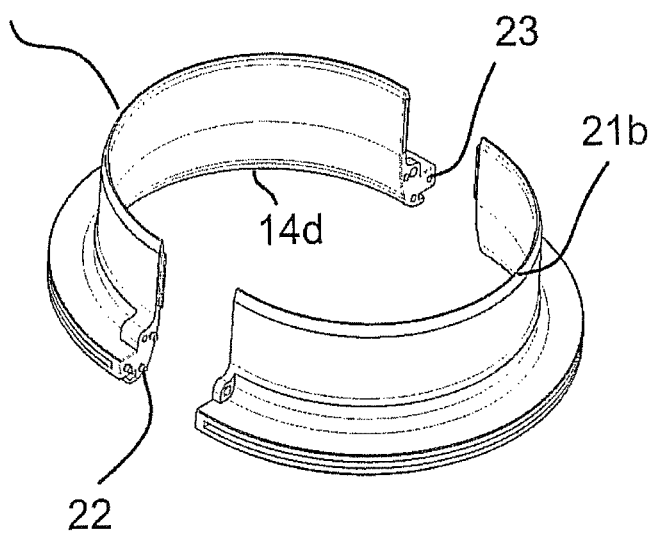
FIG. 3b a perspective view of a two-piece longitudinally-cut variant of the conducting line protection device standing alone.

Supply line protection device 14 is shown standing alone in FIG. 3*a* as a single-story component. Basic ring section 14*b* of conducting line protection device 14 carries the hollow cylinder section 14*a* which extends upward in FIG. 3*a* and the radial bearing section 14*c* which points radially outward laterally. As depicted in FIG. 3*b*, conducting line protection device 14 may be designed with multiple parts, and in particular with two parts as shown. In the depicted exemplary embodiment, conducting line protection device 14 is cut longitudinally into two similar C-shaped half-pipe sections 21*a* and 21*b*. The two half-pipe sections 21*a* and 21*b* can be joinable together in a perfect fit by means of aligning pins 22 and aligning holes 23. On a lower inner edge of conducting line protection device 14, inner edge rounding section 14*d* is provided.

Figure 4A:
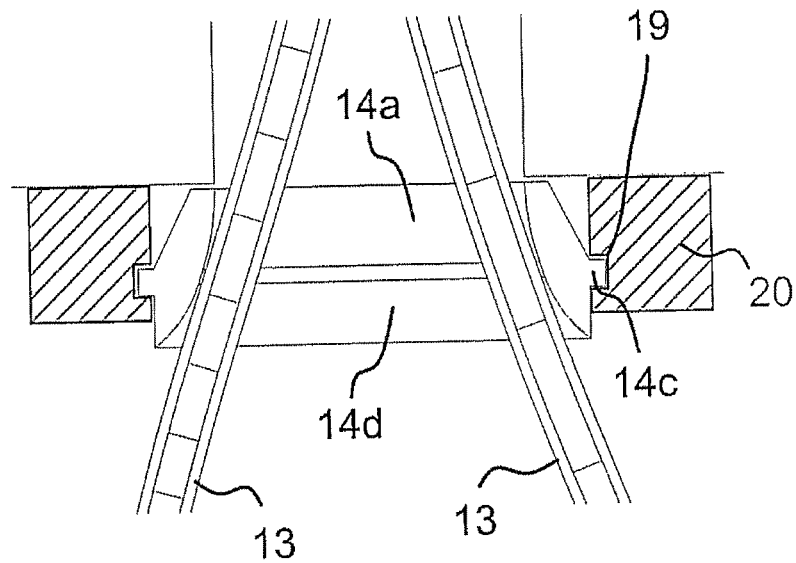
FIG. 4a an enlarged sectional view of the conducting line protection device having a friction bearing.

In the embodiment according to FIG. 4*a*, radial bearing section 14*c* forms the bearing surface of a friction bearing. Radial bearing section 14*c* has a ring projection that protrudes radially from a circumferential side of conducting line protection device 14. In this case, the radially protruding ring projection of conducting line protection device 14 is designed to engage with the corresponding ring groove 19 of carrier component 20. Carrier 20 may be formed for example by base frame 2 of industrial robot 1, as indicated in FIG. 4*a*.

Figure 4B:
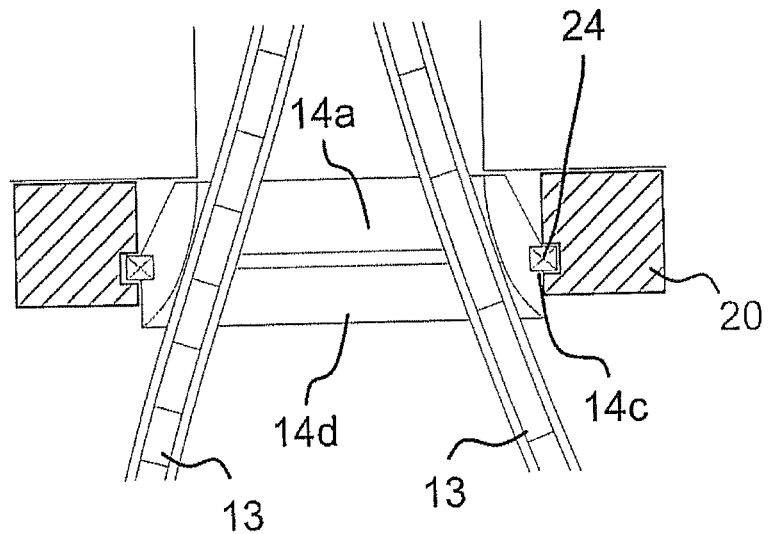
FIG. 4b an enlarged sectional view of the conducting line protection device having a rolling-contact bearing.

In an alternative embodiment to FIG. 4*a*, according to FIG. 4*b*, the friction bearing is replaced by a rolling-contact bearing 24. Radial bearing section 14*c* of conducting line protection device 14 in this case forms a groove-type seat for an inner ring of rolling-contact bearing 24. An outer ring of roller bearing 24 is fixed to carrier component 20 in the exemplary embodiment.

The invention claimed is:

1. A device for protecting a conducting line of an industrial robot, the robot including a rotatable pipe component having an inner pipe diameter and at least one power line routed through the pipe component, the device comprising:
a hollow cylinder section sized to mate with the inner pipe diameter of the rotatable pipe component; a radial bearing section supporting the hollow cylinder section adjacent the rotatable pipe component; a ring section between the hollow cylinder section and the radial bearing section; and an inner edge rounding section adjacent the radial bearing section and having a radius of curvature corresponding to a diameter of the at least one power line; wherein the radial bearing section facilitates free rotation of the device with the at least one power line so that the inner edge rounding section does not frictionally slide against the at least one power line.

2. The device of claim 1, wherein the radial bearing section includes a bearing surface of a friction bearing.

3. The device of claim 1, wherein the radial bearing section includes a seat supporting a rolling-contact bearing.

4. The device of claim 1, wherein the hollow cylinder section includes an outer diameter corresponding in size to the inner pipe diameter such that the hollow cylinder section may be disposed at least partially within the rotatable pipe component.

5. The device of claim 1, wherein the hollow cylinder section includes an inner diameter corresponding in size to the inner pipe diameter such that the hollow cylinder section and the rotatable pipe component confront one another to form a substantially continuous boundary for receiving the at least one power line.

6. The device of claim 5, wherein the hollow cylinder section and the rotatable pipe component abut to form the substantially continuous boundary.

7. The device of claim 1, wherein the hollow cylinder section, the ring section, the radial bearing section, and the inner edge rounding section are formed integrally.

8. The device of claim 1, wherein the hollow cylinder section, the ring section, the radial bearing section, and the inner edge rounding section are collectively divided into at least two partially annular segments, the segments configured to be coupled together to assemble the device.

9. The device of claim 8, wherein each of the at least two partially annular segments includes aligning holes and aligning pins configured to mate with aligning pins and aligning holes of the other partially annular segments when the segments are coupled together to assemble the conducting line protection device.

10. A robot comprising:
a base frame; a carousel configured to rotate relative to the base frame;
a pipe component coupled to one of the base frame or the carousel and having an inner pipe diameter; at least one power line routed from the base frame through the pipe component to the carousel, the at least one power line having a line diameter; and
a conducting line protection device disposed adjacent the pipe component, the conducting line protection device further comprising: a hollow cylinder section sized to mate with the inner pipe diameter of the pipe component,
a radial bearing section supporting the hollow cylinder section adjacent the pipe component, a ring section between the hollow cylinder section and the radial bearing section, and an inner edge rounding section adjacent the radial bearing section and having a radius of curvature corresponding to a diameter of the at least one power line, wherein the radial bearing section facilitates free rotation of the conducting line protection device with the at least one power line so that the inner edge rounding section does not frictionally slide against the at least one power line.

11. The robot of claim 10, wherein the pipe component is rigidly coupled to the base frame.

12. The robot of claim 10, wherein the pipe component is rigidly coupled to the carousel.

13. The robot of claim 10, further comprising:
a rolling contact bearing rotatably supporting the conducting line protection device relative to the pipe component.

14. The robot of claim 13, wherein the rolling contact bearing is coupled on a first side to the radial bearing section of the conducting line protection device, and the rolling contact bearing is coupled on a second side to the base frame.

15. The robot of claim 13, wherein the rolling contact bearing is coupled on a first side to the radial bearing section of the conducting line protection device, and the rolling contact bearing is coupled on a second side to the pipe component.

16. The robot of claim 13, wherein the radial bearing section of the conducting line protection device includes a bearing seat configured to receive the rolling-contact bearing.

17. The robot of claim 10, wherein the radius of curvature of the inner edge rounding section is about equal in length to the line diameter of the at least one power line.

18. The robot of claim 10, wherein the hollow cylinder section includes an outer diameter corresponding in size to the inner pipe diameter such that the hollow cylinder section may be disposed at least partially within the pipe component.

19. The robot of claim 10, wherein the hollow cylinder section includes an inner diameter corresponding in size to the inner pipe diameter such that the hollow cylinder section and the pipe component confront one another to form a substantially continuous boundary for receiving the at least one power line.

20. The robot of claim 10, wherein the conducting line protection device is divided into at least two partially annular segments, the segments configured to be coupled together to assemble the conducting line protection device.

* * * * *